US012810737B2

(12) United States Patent
Katre et al.

(10) Patent No.: US 12,810,737 B2
(45) Date of Patent: *Nov. 24, 2026

(54) METHOD AND APPARATUS FOR MANAGING MISSIONS OF A VEHICLE

(71) Applicant: The Boeing Company, Arlington, VA (US)

(72) Inventors: Aniruddha Katre, Natick, MA (US); Evan Orenstein, Cambridge, MA (US); Sergio Tamayo, Framingham, MA (US)

(73) Assignee: The Boeing Company, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/028,399

(22) Filed: Jan. 17, 2025

(65) Prior Publication Data

US 2025/0174130 A1 May 29, 2025

Related U.S. Application Data

(63) Continuation of application No. 18/064,101, filed on Dec. 9, 2022, now Pat. No. 12,205,475.

(51) Int. Cl.
*G08G 5/20* (2025.01)
*G05D 1/00* (2024.01)
(Continued)

(52) U.S. Cl.
CPC ............... *G08G 5/20* (2025.01); *G05D 1/101* (2013.01); *G05D 1/46* (2024.01); *G08G 5/30* (2025.01); *G08G 5/55* (2025.01); *G08G 5/57* (2025.01)

(58) Field of Classification Search
CPC .. G08G 5/20; G08G 5/30; G08G 5/55; G08G 5/57; G08G 5/50; G05D 1/101;
(Continued)

(56) References Cited

U.S. PATENT DOCUMENTS

| | | | |
|---|---|---|---|
| 6,122,572 | A | 9/2000 | Yavnai |
| 2019/0047581 | A1 | 2/2019 | Bai et al. |

(Continued)

OTHER PUBLICATIONS

Alexander, S., et al., "A Mission Management System Architecture for Cooperating Air Vehicles, Google Scholar," IEEE, Proceedings of National Aerospace and Electronics Conference (NAECON'94), May 1994, pp. 156-163.

*Primary Examiner* — Russell Frejd
(74) *Attorney, Agent, or Firm* — Harrity & Harrity, LLP

(57) ABSTRACT

Presented herein is a method and system for managing one or more missions of a vehicle. The apparatus includes one or more processors configured to control and manage flight missions and includes an active storage for executing a current mission, and a separate passive storage for subsequent missions. Subsequent missions are cued on the second storage to be validated and may be modified in view of additional information, prior to execution for maintaining positive control over the aircraft. The one or more processors are further configured to store a plurality of missions, including the current mission and a second mission, in a data store of a mission manager, each of the plurality of missions including a task graph having selected tasks to be completed for the mission, and a route map including a route for the vehicle to travel on the mission.

20 Claims, 7 Drawing Sheets

(51) Int. Cl.

| | |
|---|---|
| ***G05D 1/46*** | (2024.01) |
| ***G08G 5/30*** | (2025.01) |
| ***G08G 5/55*** | (2025.01) |
| ***G08G 5/57*** | (2025.01) |

(58) Field of Classification Search
CPC .. G05D 1/46; B64U 2101/00; B64U 2201/10; G06Q 10/083; G06Q 10/047; G06Q 10/06318; G06Q 50/40
See application file for complete search history.

(56) References Cited

U.S. PATENT DOCUMENTS

| | | | |
|---|---|---|---|
| 2021/0034075 | A1 | 2/2021 | Daniel et al. |
| 2021/0088337 | A1 | 3/2021 | Koubaa |
| 2022/0035339 | A1 | 2/2022 | Saunders et al. |
| 2022/0035372 | A1 | 2/2022 | Saunders et al. |
| 2022/0036745 | A1 | 2/2022 | Durno et al. |
| 2022/0130263 | A1 | 4/2022 | Neis et al. |
| 2023/0153142 | A1 | 5/2023 | Shabah et al. |
| 2024/0194079 | A1 | 6/2024 | Katre et al. |

METHOD AND APPARATUS FOR MANAGING MISSIONS OF A VEHICLE

RELATED APPLICATION

This application is a continuation of U.S. patent application Ser. No. 18/064,101, filed Dec. 9, 2022 (now U.S. Pat. No. 12,205,475), which is incorporated herein by reference in its entirety.

BACKGROUND

Field of the Disclosure

The present disclosure is generally related to autonomous vehicles. More particularly, the present disclosure is related to managing missions of autonomous vehicles.

Description of Related Art

Mission execution frameworks for autonomous systems, such as autonomous vehicles, are responsible for providing a standardized framework to define and execute missions, thus enabling the autonomous systems to complete a variety of missions using the same software. These missions range from a simple mission such as traveling from point to point, to a more complex mission plan such as coordinated delivery of multiple packages to their destination with other similar autonomous systems. Some presently available mission execution frameworks offer multiple capabilities in order to support common necessities for such a variety of mission plans. Some of these capabilities include: uploading mission plans while an unmanned autonomous system (UAS) is on the ground; uploading mission plans while the UAS is in flight; starting a mission while the UAS is in its initial state; repeating a mission that has already been executed without needing to re-upload it; storing multiple mission plans; reporting on the status of a mission being executed as well as status of storage capacity being used; and executing contingencies in case of failures.

However, the presently available mission execution frameworks have several shortcomings as well. Mission data uploaded to the UAS for storage (i.e., future missions) and mission data corresponding to the mission in progress are not separated. This results in issues that compromise the effectiveness of the mission execution. In the case of attempting a mission switch mid-flight, the state of the mission in progress is erased when the new mission is started. Therefore, it is not possible to revert back to or continue previous missions in case of failure to successfully start the new mission. The frameworks that have a limited storage capacity for mission data currently do not provide the ability to clear missions that are stored. This limits how many missions that are allowed to be completed before a software reset is necessary. Other frameworks dynamically assign more storage space which leads to uncontrolled memory use until the hardware memory limit is reached. It is not possible to modify parameters of a mission stored onboard the system without fully overwriting it.

It would therefore be desirable to have a system and method that takes into account at least some of the issues discussed above, as well as other possible issues.

SUMMARY

Example implementations of the present disclosure are directed to a method and apparatus for managing missions of a vehicle. The features described herein allow for implementing a safer, more robust, and more flexible mission execution framework that supports completion of mission operations for various vehicles. The present disclosure includes a mission manager that acts as the central storage of all mission data uploaded to the mission execution framework. This makes it possible to easily modify parameters of stored missions. It also improves the safety and robustness of the framework by allowing the task manager and the route service manager, the other two modules in the framework, to focus on the mission being executed and on the next mission being queued for execution. The mission manager dispenses data to the task manager and route service manager modules and orchestrates the execution of a new mission or queueing of a mission to prepare it for execution. The task manager and route service manager implement dual storage to implement separation of data between the mission being executed and the mission being queued for future execution. The storage used for active mission data vs. inactive mission data in the task manager and route service manager is identified using tokens which are controlled by the mission manager.

The present disclosure thus includes, without limitation, the following example implementations.

Some example implementations provide a method a method of managing one or more missions of a vehicle, the method comprising: in response to a mission initiation request directing a first task graph for a first mission from a mission manager, the mission manager being in communication with the vehicle and comprising a processor, to a task manager engaged with the vehicle and comprising a processor, the task manager being configured to store the first task graph in a first task storage unit, and to provide instructions to the vehicle for completing selected tasks in the first task graph, and directing a first route map for the first mission from the mission manager to a route service manager engaged with the vehicle and comprising a processor, the route service manager being configured to store the first route map in a first route storage unit, and the task manager further configured to provide instructions to the vehicle for traveling along a route according to the first route map; executing the first mission by the mission manager controlling the task manager to execute the selected tasks in the first task graph from the first task storage unit and the task manager to execute the first route map from the first route storage unit; in response to a first mission change request directing a second task graph for a second mission from the mission manager to the task manager for storage in a second task storage unit discrete from the first task storage unit, and directing a second route map for the second mission from the mission manager to the route service manager for storing the second route map in a second route storage unit discrete from the first route storage unit; and executing the second mission by the mission manager controlling the task manager to discontinue execution of the first task graph, and to discontinue execution of the first route map, the task manager to execute the second task graph from the second task storage unit, and to execute the second route map from the second route storage unit.

In some example implementations of the method of any preceding example implementation, or any combination thereof, the method further comprises storing a plurality of missions, including the first mission and second mission, in a data store of the mission manager, each of the plurality of missions including a task graph having selected tasks to be completed for the mission, and a route map including a route for the vehicle to travel on the mission.

In some example implementations of the method of any preceding example implementation, or any combination thereof, the method further comprises modifying, via the mission manager, the task graph or the route map of one of the plurality of missions in the data store.

In some example implementations of the method of any preceding example implementation, or any combination thereof, the method further comprises directing, via the mission manager, a command to the task manager to modify the first task graph or the second task graph in correspondence with the modified task graph.

In some example implementations of the method of any preceding example implementation, or any combination thereof, the method further comprises directing, via the mission manager, a command to the route service manager to modify the first route map or the second route map in correspondence with the modified route map.

In some example implementations of the method of any preceding example implementation, or any combination thereof, the method further comprises executing the second mission before the first mission is complete, and then resuming execution of the first mission after the second mission is complete.

In some example implementations of the method of any preceding example implementation, or any combination thereof, the method further comprises, in response to a second mission change request: clearing, by the task manager, the first or second task storage unit having the task graph not being executed upon receipt of the second mission change request; directing a third task graph for a third mission from the mission manager to the task manager for storage in the cleared first or second task storage unit; clearing, by the route service manager, the first or second route storage unit having the route map not being executed upon receipt of the second mission change request; directing a third route map for the third mission from the mission manager to the route service manager for storage in the cleared first or second route storage unit; and executing the third mission by the mission manager.

In some example implementations of the method of any preceding example implementation, or any combination thereof, each of the first and second task storage units is configured to store a single task graph, and wherein each of the first and second route storage units is configured to store a single route map.

In some example implementations of the method of any preceding example implementation, or any combination thereof, each of the first task storage unit, the second task storage unit, the first route storage unit, and the second route storage unit each include a unique storage identifier associated therewith, and wherein the method further comprises associating, by the mission manager, the unique storage identifier of the first or second task storage unit or the first or second route storage unit with the task graph or route map directed by the mission manager to the task manager or the route service manager for storage in the corresponding storage unit.

In some example implementations of the method of any preceding example implementation, or any combination thereof, the route service manager is further configured to store one or more other routes including a contingency route, a specific route, or a temporary route; and wherein directing the first route map for the first mission from the mission manager to the route service manager includes directing the first route map for the first mission from the mission manager to the route service manager only if the mission being initiated includes a pre-uploaded route.

Some other example implementations provide an apparatus for managing one or more missions of a vehicle, the apparatus comprising: one or more processors and a non-transitory computer readable medium storing executable instructions thereon, wherein the one or more processors are configured to execute the executable instructions which thereby causes the one or more processors to be configured to: in response to a mission initiation request, direct a first task graph for a first mission from a mission manager, the mission manager being in communication with the vehicle and executed by the one or more processors, to a task manager engaged with the vehicle and executed by the one or more processors, the task manager being configured to store the first task graph in a first task storage unit, and to provide instructions to the vehicle for completing selected tasks in the first task graph, and direct a first route map for the first mission from the mission manager to a route service manager engaged with the vehicle and executed by the one or more processors, the route service manager being configured to store the first route map in a first route storage unit, and the task manager further configured to provide instructions to the vehicle for traveling along a route according to the first route map; execute the first mission by the mission manager controlling the task manager to execute the selected tasks in the first task graph from the first task storage unit and the task manager to execute the first route map from the first route storage unit; in response to a first mission change request, direct a second task graph for a second mission from the mission manager to the task manager for storage in a second task storage unit discrete from the first task storage unit, and to direct a second route map for the second mission from the mission manager to the route service manager for storing the second route map in a second route storage unit discrete from the first route storage unit; and execute the second mission by the mission manager controlling the task manager to discontinue execution of the first task graph, and to discontinue execution of the first route map, the task manager to execute the second task graph from the second task storage unit, and to execute the second route map from the second route storage unit.

In some example implementations of the apparatus of any preceding example implementation, or any combination thereof, the one or more processors are further configured to store a plurality of missions, including the first mission and second mission, in a data store of the mission manager, each of the plurality of missions including a task graph having selected tasks to be completed for the mission, and a route map including a route for the vehicle to travel on the mission.

In some example implementations of the apparatus of any preceding example implementation, or any combination thereof, the mission manager is configured to modify the task graph or the route map of one of the plurality of missions in the data store.

In some example implementations of the apparatus of any preceding example implementation, or any combination thereof, the mission manager is configured to direct a command to the task manager to modify the first task graph or the second task graph in correspondence with the modified task graph.

In some example implementations of the apparatus of any preceding example implementation, or any combination thereof, wherein the mission manager is configured to direct a command to the route service manager to modify the first route map or the second route map in correspondence with the modified route map.

In some example implementations of the apparatus of any preceding example implementation, or any combination thereof, the mission manager is configured to execute the second mission before the first mission is complete, and then resume execution of the first mission after the second mission is complete.

In some example implementations of the apparatus of any preceding example implementation, or any combination thereof, in response to a second mission change request: the task manager is configured to clear the first or second task storage unit having the task graph not being executed upon receipt of the second mission change request; the mission manager is configured to direct a third task graph for a third mission to the task manager for storage in the cleared first or second task storage unit; the route service manager is configured to clear the first or second route storage unit having the route map not being executed upon receipt of the second mission change request; the mission manager is configured to direct a third route map for the third mission to the route service manager for storage in the cleared first or second route storage unit; and the mission manager is configured to execute the third mission.

In some example implementations of the apparatus of any preceding example implementation, or any combination thereof, each of the first and second task storage units is configured to store a single task graph, and wherein each of the first and second route storage units is configured to store a single route map.

In some example implementations of the apparatus of any preceding example implementation, or any combination thereof, each of the first task storage unit, the second task storage unit, the first route storage unit, and the second route storage unit each include a unique storage identifier associated therewith, and wherein the mission manager is further configured to associate the unique storage identifier of the first or second task storage unit or the first or second route storage unit with the task graph or route map directed by the mission manager to the task manager or the route service manager for storage in the corresponding storage unit.

In some example implementations of the apparatus of any preceding example implementation, or any combination thereof, the route service manager is further configured to store one or more other routes including a contingency route, a specific route, or a temporary route; and wherein the mission manager configured to direct the first route map for the first mission to the route service manager includes the mission manager configured to direct the first route map for the first mission to the route service manager only if the mission being initiated includes a pre-uploaded route.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

Figure 1:
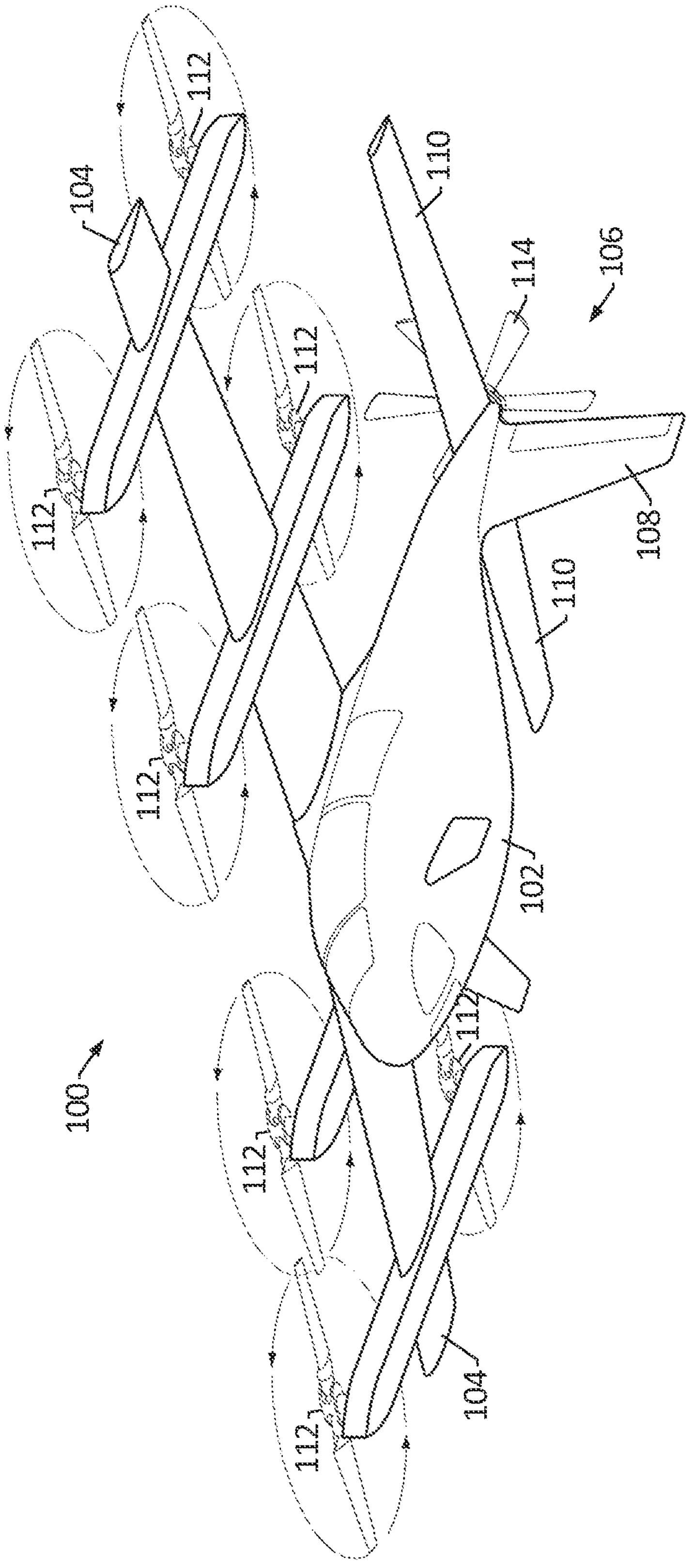
FIG. 1 illustrates an example aircraft, according to some embodiments of the present disclosure.

Some examples of the present disclosure will now be described more fully hereinafter with reference to the accompanying drawings, in which some, but not all aspects of the disclosure are shown. Indeed, various examples of the disclosure are embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) is instead below, and vice versa; and similarly, something described as being to the left of something else is instead to the right, and vice versa. Like reference numerals refer to like elements throughout.

Example implementations of the present disclosure relate generally to autonomous and robotic vehicles and, in particular, to one or more of the design, construction, operation or use of robotic or autonomous aircraft. As used herein, a robotic aircraft is a machine designed and configurable to execute maneuvers in its environment. In some example implementations, the robotic aircraft is manned or unmanned. For example, any mention herein of an aircraft, vehicle, autonomous system, or the like, refers to unmanned autonomous systems (UAS), such as an unmanned autonomous aircraft. In some example implementations, the robotic aircraft is semi-autonomous or fully-autonomous in which at least some of the maneuvers are executed independent of or with minimal human intervention. In some examples, the robotic aircraft is operable in various modes with various amounts of human control.

The present disclosure is also relevant in the context of non-aerial robotic or autonomous vehicles (e.g., ground, or water vehicles). Examples of suitable robotic aerial and non-aerial vehicles include aerobots, androids, automatons, autonomous vehicles, explosive ordnance disposal robots, hexapods, industrial robots, insect robots, microbots, nanobots, military robots, mobile robots, rovers, service robots, surgical robots, walking robots, and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These include autonomous cars, planes, trains, industrial vehicles, fulfillment center robots, supply-chain robots, robotic vehicles, mine sweepers, and the like.

FIG. 1 illustrates one type of robotic aircraft, namely, a UAV 100, that benefits from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to, respectively, the wings and the end of the tail assembly for lifting and propelling the UAV during flight. The present disclosure relates to robotic aircraft, but also to pilot-controlled aircraft. Any description herein with respect to the aircraft being autonomous or robotic also relates to describing operations of the method and system herein when the aircraft is pilot-controlled.

Figure 2:
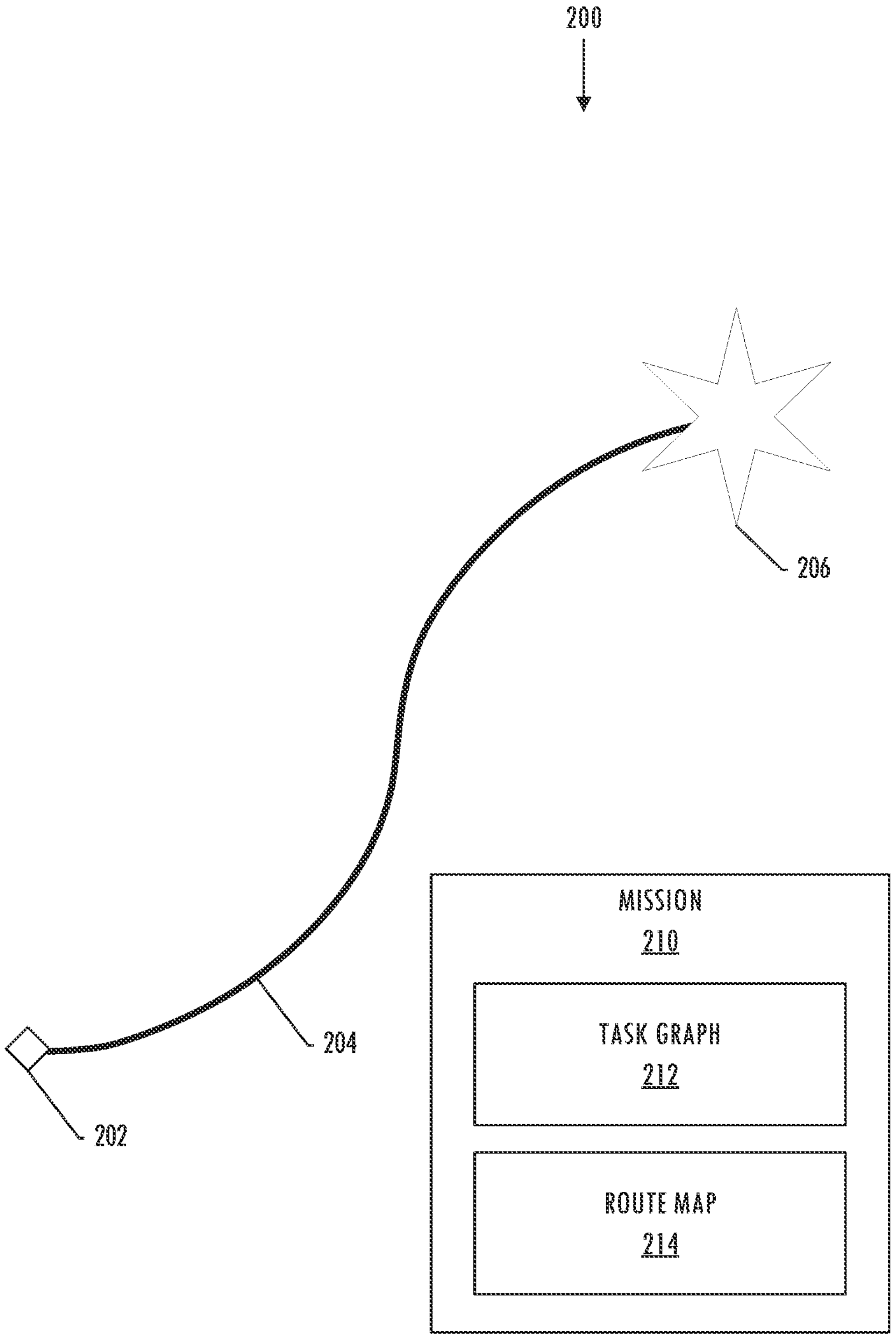
FIG. 2 illustrates an example mission layout, according to some embodiments of the present disclosure.

FIG. 2 illustrates an example mission layout of a mission being executed by a vehicle, such as aircraft 202. The aircraft is traveling along a route 204 towards a destination 206. Along the way, or upon reaching the destination, the aircraft is configured to complete its mission 210, which includes a task graph 212 and a route map 214. The task graph includes one or more selected tasks to be completed for the mission. The one or more selected tasks include any suitable tasks executable by the aircraft. For example, delivering an object to the destination or taking a picture of the destination. The route map includes data characterizing the route along which the aircraft will take while performing the mission. For example, the route map will include data characterizing the route 204 the aircraft is traversing during the mission. The task graph includes instructions for the aircraft to execute maneuvers to travel along the route based on the route map.

As described herein, and in some example embodiments, the mission 210 which the aircraft 202 is supposed to be executing changes mid-mission. For example, the aircraft is executing mission 1 with corresponding task graph 1, and before the aircraft has completed mission 1, the aircraft is instructed to change to mission 2 with corresponding task graph 2. The aircraft will start executing mission 2, and either complete mission 2 and revert back to mission 1 or not complete mission 2 and move on to another mission entirely. Various other example implementations of various missions are also possible, such as not completing any missions, for example because of loss of battery life or some emergency.

Figure 3A:
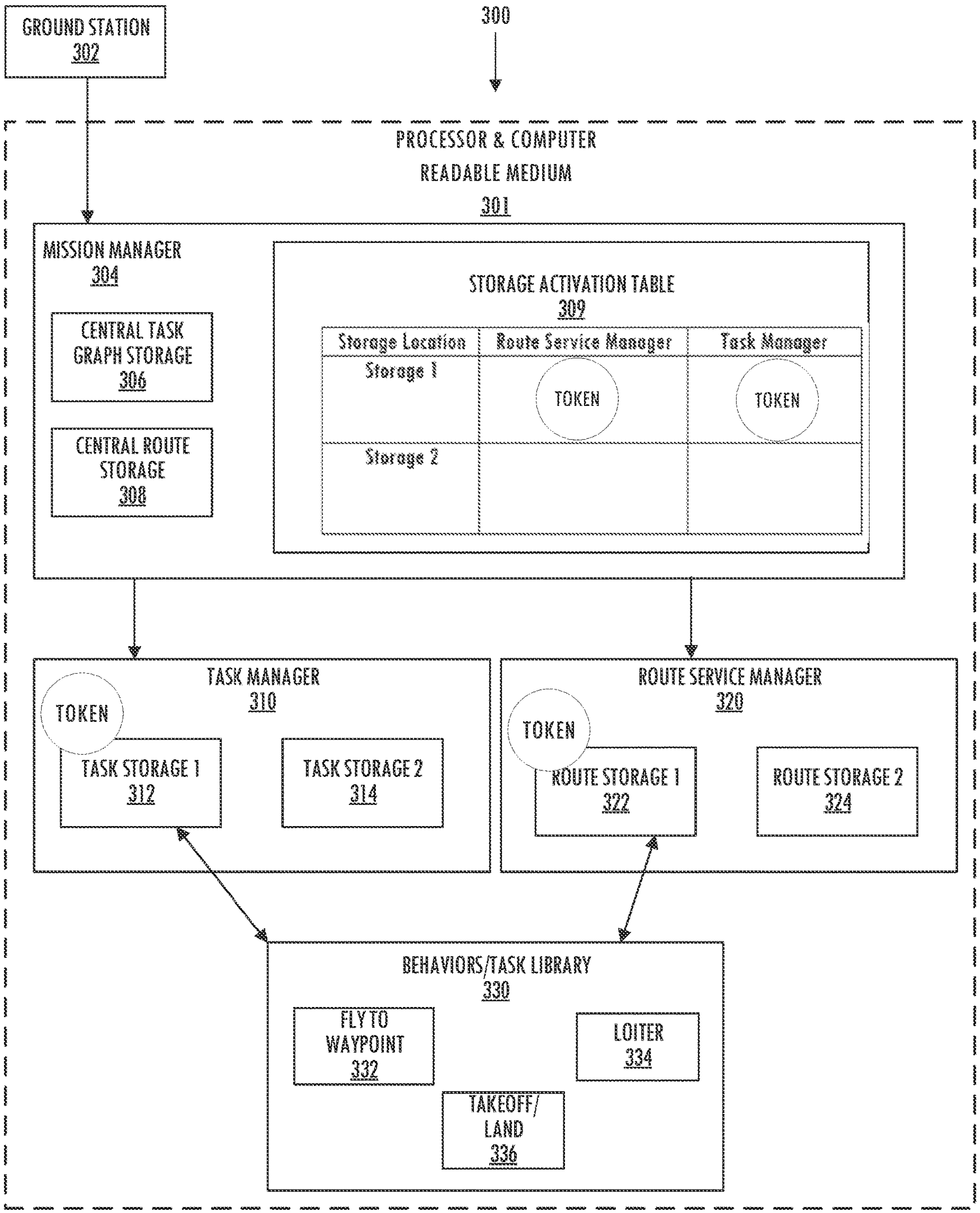
FIGS. 3A and 3B illustrate various block diagrams of an example apparatus for managing a mission.

FIG. 3A illustrates a block diagram of an apparatus 300 for managing one or more missions of a vehicle, such as aircraft 202 from FIG. 2. In some example implementations, the apparatus comprises one or more processors and a non-transitory computer readable medium 301 storing executable instructions thereon. The one or more processors are configured to execute the executable instructions which thereby causes the one or more processors to be configured to execute various functions described herein to manage the one or more missions of the aircraft.

In some example implementations, the apparatus 300 is in communication with a ground station 302 which is configured to transmit mission data described hereinbelow and/or instructions for the aircraft to execute one or more missions to the apparatus for storage and execution. To manage the mission(s), the apparatus includes or executes various execution blocks, such as, for example, a mission manager 304, a task manager 310, a route service manager 320, and a behaviors/task library 330, the operations of which are described in more detail below.

The mission manager 304 includes a central task graph storage 306 and a central route storage 308. Each of these storage units is a part of the non-transitory computer readable medium of the apparatus. Alternatively, each of the storage units is a separate non-transitory computer readable medium. The central task graph storage stores one or more task graphs associated with one or more corresponding missions received by the apparatus from the ground station 302. The central route storage stores one or more route maps associated with the one or more corresponding missions received by the apparatus. For example, the ground station 302 will send the apparatus one or more missions, each including a corresponding task graph and route map. The apparatus will receive each of these missions and store the corresponding task graph and route map in the central task graph storage and central route storage, respectively.

The mission manager 304 further comprises a storage activation table 309, which indicates, using the TOKEN, which of Storage 1 or Storage 2 in each of the route service manager 320 and the task manager 310 is active at any given time. The TOKEN is a logical indicator, indicating which of the storage locations is active. For example, if the storage activation table shows the TOKEN located at Storage 1 for the route service manager and at Storage 1 for the task manager, it indicates that a corresponding task storage 1 312 of the task manager and a route storage 1 322 of the route service manager are active. This functionality is described in further detail below.

As described above, the task manager 310 and the route storage manager 320 each have their own corresponding storage 1 and storage 2. Task storage 1 312 and task storage 2 314 of the task manager are each configured for storing a different task graph. Each of task storage 1 and task storage 2 are a part of the non-transitory computer readable medium of the apparatus 300 or they are a part of another non-transitory computer readable medium. Each task graph stored in either task storage 1 or task storage 2 includes a task graph of the currently executing mission of the aircraft, a task graph of a former mission that was being executed by the aircraft, or a task graph of a future mission to be executed by the aircraft (e.g., a mission queued up for future execution). For example, task storage 1 contains the task graph of the mission that is currently being executed, as indicated by the TOKEN located over task storage 1, and task storage 2 contains the task graph of the mission that will be executed next by the apparatus. Only one task graph is executed at any given time, so the TOKEN is only assigned to either task storage 1 or task storage 2.

Similarly, each route map stored in either route storage 1 322 or route storage 2 324 includes a route map of the currently executing mission of the aircraft 202, a route map of a former mission that was being executed by the aircraft, or a route map of a future mission to be executed by the aircraft. For example, route storage 1 contains the route map of the mission that is currently being executed, as indicated by the TOKEN located over route storage 1, and route storage 2 contains the route map of the mission that will be executed next by the apparatus 300. Only one route map is executed at any given time, so the TOKEN is only assigned to either route storage 1 or route storage 2. Each of route storage 1 and route storage 2 are a part of the non-transitory computer readable medium of the apparatus or they are a part of another non-transitory computer readable medium.

The apparatus 300 further includes the behaviors/task library 330, which includes more specifics on the tasks to be completed/executed and routes to be traveled along. The behaviors/task library is accessed and used by each of the task manager 310 and the route service manager 320 to help execute the missions which include: flying to a waypoint 332, loiter 334, and/or takeoff/land 336.

In some example implementations, the ground station 302 will transmit a mission initiation request to the apparatus 300 to initiate execution of a mission for the aircraft 202. In response to the mission initiation request, the apparatus (e.g., such as by the one or more processors 301) is configured to direct a first task graph for a first mission from the mission manager 304 to the task manager 310. As described herein, the mission manager (e.g., as part of the apparatus) is in communication with the aircraft and executed by the one or more processors. In addition, as described herein, the task manager is engaged with the aircraft (e.g., as part of the apparatus) and executed by the one or more processors. The task manager is configured to store the first task graph in a first task storage unit, such as task storage 1 312, and to provide instructions to the aircraft for completing selected tasks in the first task graph.

The apparatus 300 is further configured to direct a first route map for the first mission from the mission manager 304 to the route service manager 320. As described herein, the route service manager is engaged with the aircraft 202 (e.g., as part of the apparatus) and executed by the one or more processors 301. As described herein, the route service manager is configured to store the first route map in a first route storage unit, such as route storage 1 322. The task manager 310 is configured to provide instructions to the aircraft for traveling along a route according to the first route map stored in route storage 1. That is, the task manager is configured to either query the route service manager for the first route map instructions, or otherwise receive the first route map instructions from the route service manager.

The mission manager 304 is configured to receive the mission initiation request from the ground station 302, or any other suitable source, which includes the mission to be executed, including the task graph and route map to be executed. If the corresponding task graph and route map of the mission are already stored in the central task graph storage 306 and the central route storage 308, respectively, the mission manager does not need to re-store the mission. Instead, the mission manager merely sends a signal to the task manager 310 indicating which of task storage 1 312 or task storage 2 314 (whichever has the task graph corresponding to the mission to be executed) to become active if the task graph of the corresponding mission to be executed is already stored in task storage 1 or task storage 2, or send the appropriate task graph to the task manager for storage in task storage 1 or task storage 2 and signal the appropriate task storage to become active. Similar functionality occurs by the mission manager for the route service manager 320 to store and/or signal as active the route map into route storage 1 322 or route storage 2 324.

The apparatus 300 is configured to execute the first mission using the mission manager 304, the mission manager controlling the task manager 310 to execute the selected tasks in the first task graph from the first task storage unit, such as task storage 1 312. The apparatus is further configured to execute the first mission using the mission manager to control the task manager to execute the first route map from the first route storage unit, such as route storage 1 322.

In response to a first mission change request received by the apparatus 300 (e.g., from ground station 302), the apparatus is configured to direct a second task graph for a second mission from the mission manager 304 to the task manager 310 for storage in a second task storage unit, such as task storage 2 314, discrete from the first task storage unit, such as task storage 1 312. The apparatus is further configured to direct a second route map for the second mission from the mission manager to the route service manager 320 for storing the second route map in a second route storage unit, such as route storage 2 324, discrete from the first route storage unit, such as route storage 1 322.

Figure 3B:
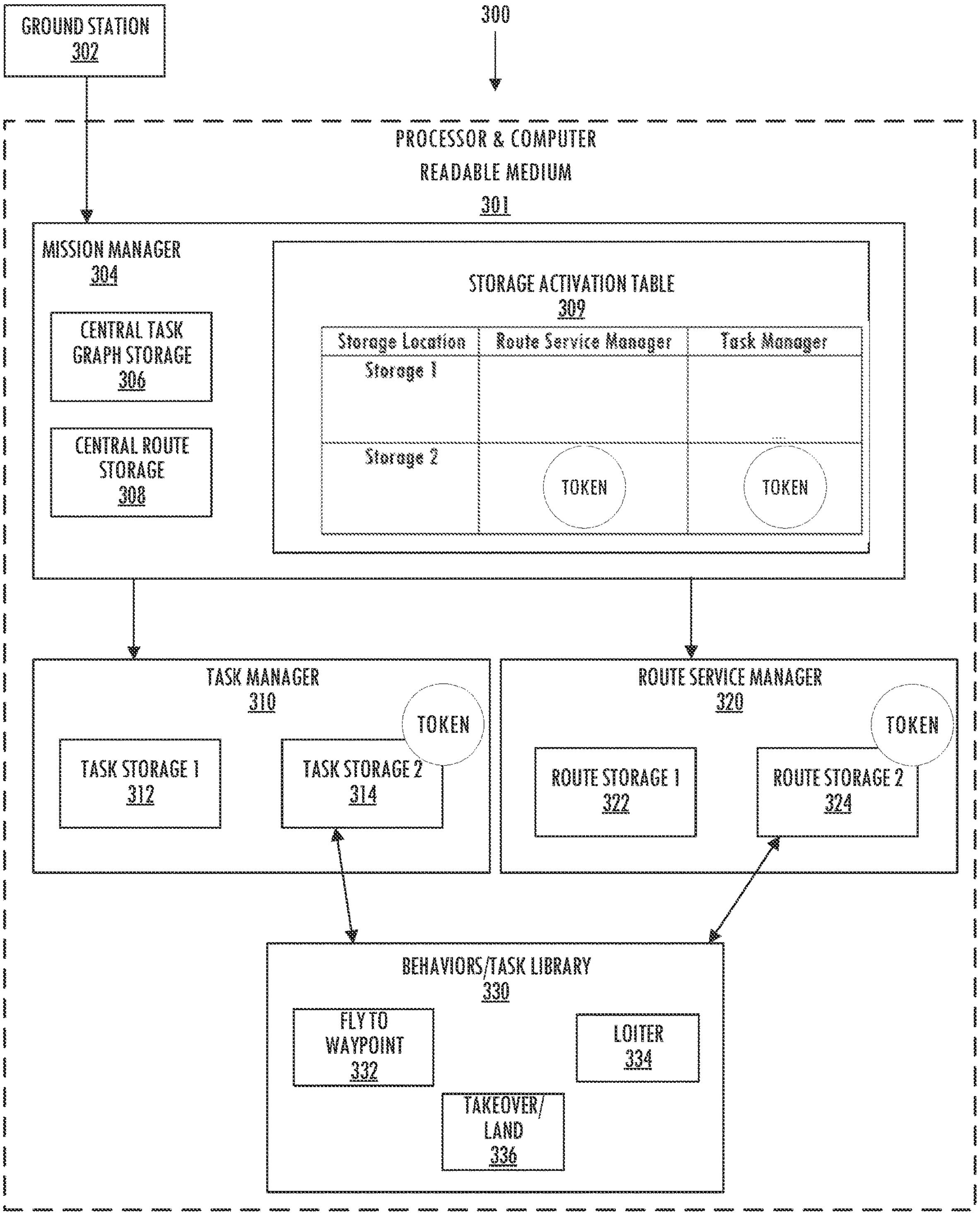

As illustrated in FIG. 3B, which illustrates another view of the block diagram of the apparatus 300, the TOKEN over task storage 1 312 has moved to task storage 2 314, indicating that task storage 2 is now the active task storage and the task manager 310 is now executing the task graph stored in task storage 2, corresponding to the task graph for the second mission. Additionally, the TOKEN over route storage 1 322 has moved to route storage 2 324, indicating that route storage 2 is now the active route storage and the task manager 310 is now executing the route map stored in route storage 2, corresponding to the route map for the second mission. The apparatus is further configured to execute the second mission by the mission manager 304 controlling the task manager 310 to discontinue execution of the first task graph, and to discontinue execution of the first route map. The task manager is further configured to execute the second task graph from the second task storage unit, such as task storage 2, and to execute the second route map from the second route storage unit, such as route storage 2 324.

As stated above, the one or more processors 301 (or the apparatus 300) are further configured to store a plurality of missions, including the first mission and second mission (i.e., the corresponding task graphs and route maps thereof), in a data store of the mission manager 304, such as central task graph storage 306 and central route storage 308, or more generally, the non-transitory computer readable medium. Each of the plurality of missions include a task graph having selected tasks to be completed for the mission, and a route map including a route for the aircraft to travel along on the mission. In some example implementations, the mission manager is configured to modify the task graph or the route map of one of the plurality of missions in the data store. In such an example, the mission manager is configured to direct a command to the task manager 310 to modify the first task graph or the second task graph in correspondence with the modified task graph. For example, during the execution of a mission, or prior to a mission being executed, changes are made to the mission. Some example changes include a changed action at the destination, a change in action of the aircraft along the route, one or more delivery items being changed, and the like. In addition, the mission manager is configured to direct a command to the route service manager 320 to modify the first route map or the second route map in correspondence with the modified route map. Some example changes include a change in destination of the mission, a route deviation, or the like.

In some example implementations, the mission manager 304 is configured to execute the second mission before the first mission is complete, and then resume execution of the first mission after the second mission is complete. For example, using the scenario illustrated in FIG. 3A, the apparatus 300 is executing the first mission whose task graph is currently stored in task storage 1 312 and whose route map is stored in route storage 1 322. The mission manager directs a signal to the task manager and the route service manager indicating that the task storage 2 314, storing the task graph of mission 2, and the route storage 2 324, storing the route map of mission 2, should now become active and the task manager and route service manager effectuate that change. The scenario in FIG. 3B is now active and, as indicated by the TOKEN, the second mission, whose task graph is stored in task storage 2 and route map is stored in route storage 2, is being executed by the apparatus. Then the mission manager directs another signal to the task manager and the route service manager indicating that the task storage 1 and the route storage 1 should again become active, and the task manager and route service manager effectuate this change. The scenario in FIG. 3A is now active again and mission 1 is being executed as described above.

In some example implementations, the above switch between executing mission 1 and mission 2 occurs at any time. Additionally, a third mission is configured to be installed in the task manager 310 and the route service manager 320, but this requires the clearing of one of the sets of storage. For example, in response to a second mission change request, the task manager is configured to clear the first or second task storage unit, such as task storage 1 312 or task storage 2 314, having the task graph not being executed upon receipt of the second mission change request. Further, the mission manager 304 is configured to direct a third task graph for a third mission to the task manager for storage in the cleared first or second task storage unit. The route service manager is configured to clear the first or second route storage unit, such as route storage 1 322 or route storage 2 324, having the route map not being executed upon receipt of the second mission change request. In the illustrations shown in FIG. 3A or FIG. 3B, the cleared storage unit would be the storage unit without the TOKEN. For example, in FIG. 3B, task storage 1 and route storage 1 would be the storage units that are cleared because they do not have the TOKEN. The mission manager is configured to then direct a third route map for the third mission to the route service manager for storage in the cleared first or second route storage unit. After the third task graph is stored in the cleared task storage and the third route map is stored in the cleared route storage, the mission manager is configured to execute the third mission.

In some example implementations, each of the first and second task storage units, such as task storage 1 312 and task storage 2 314, is configured to store a single task graph, and each of the first and second route storage units, such as route storage 1 322 and route storage 2 324, is configured to store a single route map. In some examples, a single route map includes a map of one or more routes, each route associated with a corresponding task graph. For example, a route map stored in route storage 1 includes one or more routes, each of the routes associated with a task graph stored in task storage 1. Route storage 2 includes similar routes associated with a task graph stored in task storage 2.

In some example implementations, each of the first task storage unit (i.e., task storage 1 312), the second task storage unit (i.e., task storage 2 314), the first route storage unit (i.e., route storage 1 322), and the second route storage unit (i.e., route storage 1 324) each include a unique storage identifier associated therewith. The mission manager 304 is further configured to associate the unique storage identifier of the first or second task storage unit or the first or second route storage unit with the task graph or route map directed by the mission manager to the task manager 310 or the route service manager 320 for storage in the corresponding storage unit. The unique storage identifier is used by the mission manager to identify the different storage units and the mission manager uses the unique storage identifier to indicate to the task manager and the route service manager which of the first task storage unit (i.e., task storage 1 312), the second task storage unit (i.e., task storage 2 314), the first route storage unit (i.e., route storage 1 322), or the second route storage unit (i.e., route storage 1 324) should be active.

In some example implementations, the route service manager 320 is further configured to store one or more other routes including a contingency route, a specific route, or a temporary route. Furthermore, the mission manager 304 being configured to direct the first route map for the first mission to the route service manager includes the mission manager configured to direct the first route map for the first mission to the route service manager only if the mission being initiated includes a pre-uploaded route.

Figure 3C:
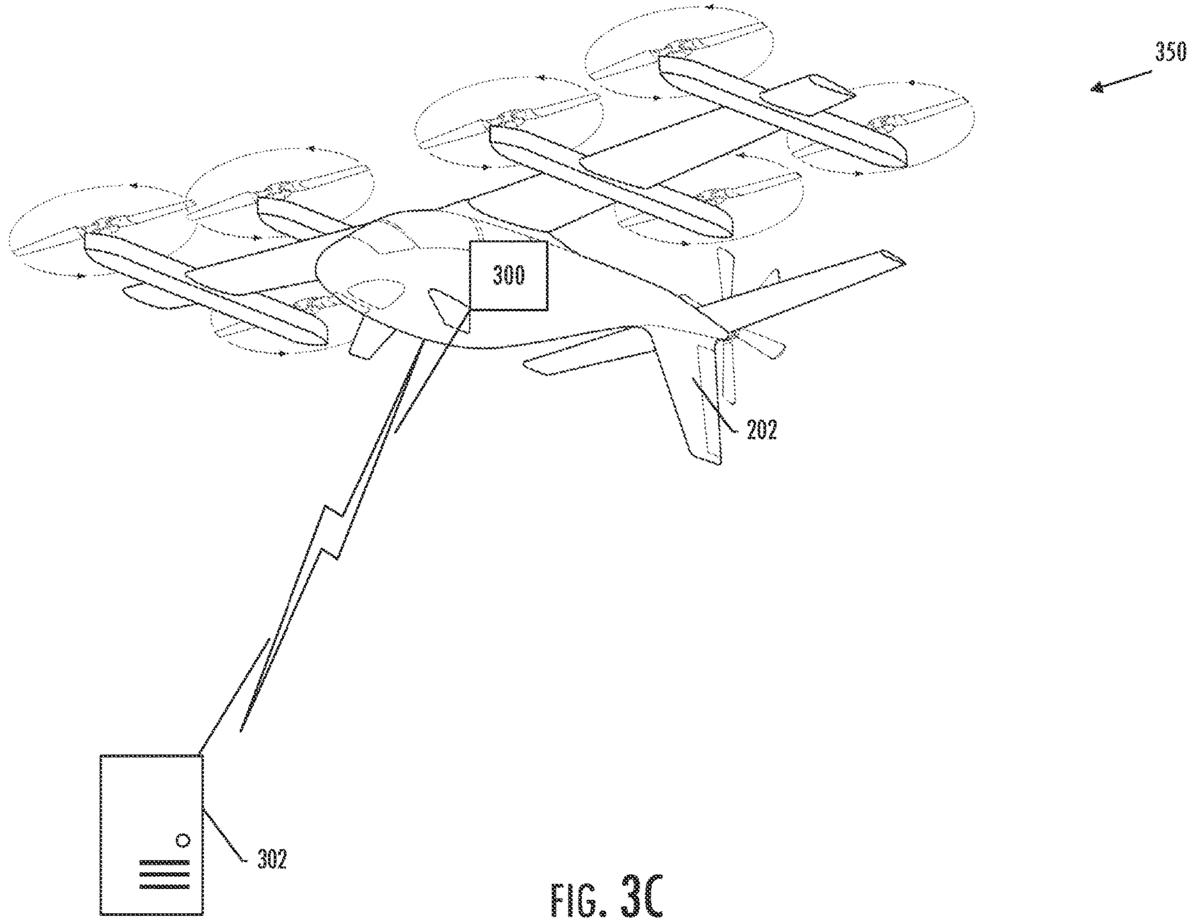
FIG. 3C illustrates an example aircraft environment where the apparatus of FIGS. 3A and 3B is onboard an example aircraft, according to some embodiments of the present disclosure.
Figure 4:
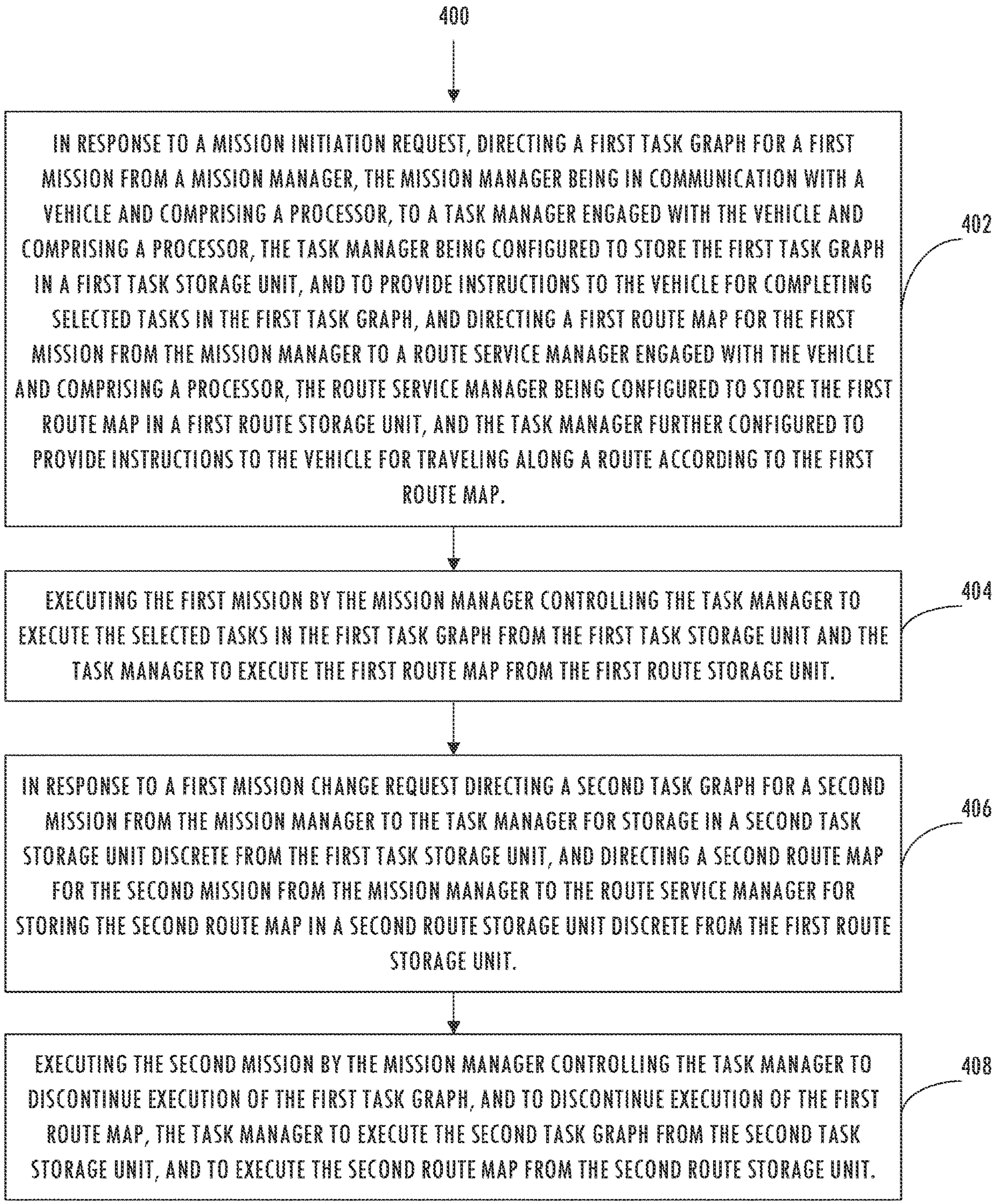
FIG. 4 illustrates a flow chart detailing steps of an example method, according to some embodiments of the present disclosure.

FIG. 3C illustrates an example aircraft environment 350, according to some implementations of the present disclosure, where the apparatus 300 for managing a mission is located on the aircraft 202 described above. The apparatus is configured to perform the operations described above as well as the method described herein. The apparatus is in communication (e.g., wireless or wired communication) with a ground station 302 comprising one or more computing devices configured to transmit the one or more missions, including respective task graphs and route maps, to the apparatus for storage in the central task graph storage and the central route storage. Furthermore, the ground station is configured to transmit one or more mission change requests to the apparatus. Other devices, such as aerial or air-based computing devices, computing systems, and the like are also potential sources of both the missions and the mission change requests. FIG. 4 illustrates a flow chart of an example method 400 for managing a mission of an aircraft or other vehicle. As shown at block 402, the method includes in response to a mission initiation request directing a first task graph for a first mission from a mission manager, the mission manager being in communication with the vehicle and comprising a processor, to a task manager engaged with the vehicle and comprising a processor, the task manager being configured to store the first task graph in a first task storage unit, and to provide instructions to the vehicle for completing selected tasks in the first task graph, and directing a first route map for the first mission from the mission manager to a route service manager engaged with the vehicle and comprising a processor, the route service manager being configured to store the first route map in a first route storage unit, and the task manager further configured to provide instructions to the vehicle for traveling along a route according to the first route map.

As shown at block 404, the method 400 includes executing the first mission by the mission manager controlling the task manager to execute the selected tasks in the first task graph from the first task storage unit and the task manager to execute the first route map from the first route storage unit. As shown at block 406, the method includes in response to a first mission change request directing a second task graph for a second mission from the mission manager to the task manager for storage in a second task storage unit discrete from the first task storage unit, and directing a second route map for the second mission from the mission manager to the route service manager for storing the second route map in a second route storage unit discrete from the first route storage unit. As shown at block 408, the method includes executing the second mission by the mission manager controlling the task manager to discontinue execution of the first task graph, and to discontinue execution of the first route map, the task manager to execute the second task graph from the second task storage unit, and to execute the second route map from the second route storage unit.

According to example implementations of the present disclosure, the apparatus 300 for managing the mission of the aircraft is implemented by various means. Means for implementing the apparatus includes hardware, alone or under direction of one or more computer programs from a computer-readable storage medium. In some examples, one or more apparatuses are configured to function as or otherwise implement the apparatus shown and described herein. In examples involving more than one apparatus, the respective apparatuses are connected to or otherwise in communication with one another in a number of different manners, such as directly or indirectly via a wired or wireless network or the like.

Figure 5:
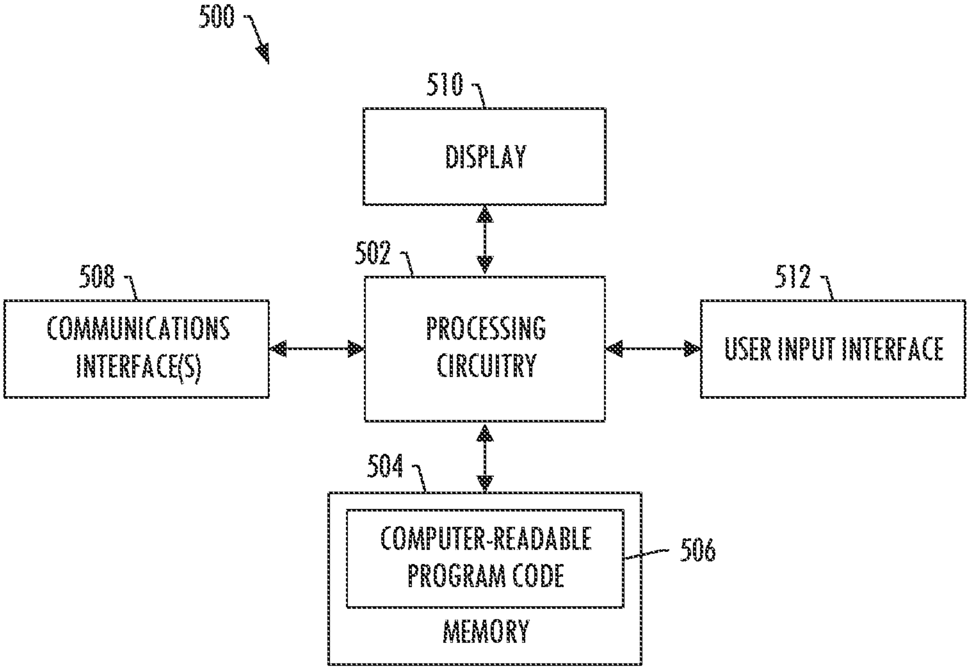
FIG. 5 illustrates an example apparatus for performing the method and other functions described herein, according to some embodiments of the present disclosure.

FIG. 5 illustrates an apparatus 500 capable of implementing the apparatus 300 for managing a mission according to some example implementations of the present disclosure that is collocated. The apparatus 500 is an example device that is used to implement the methods and functions described above with respect to the apparatus for managing a mission of the aircraft. The apparatus is in communication with a ground station and configured to receive one or missions and/or one or more other data transmissions from the ground station for managing the mission. Generally, an apparatus of exemplary implementations of the present disclosure comprises, includes, or is embodied in one or more fixed or portable electronic devices. Examples of suitable electronic devices include a microcontroller, controller, smartphone, tablet computer, laptop computer, desktop computer, workstation computer, server computer or the like. The apparatus includes one or more of each of a number of components such as, for example, processing circuitry 502 (e.g., processor unit or computer processor) connected to a memory 504 (e.g., storage device).

The processing circuitry 502 is composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which is packaged as an integrated circuit or multiple interconnected integrated circuits (an integrated circuit at times more commonly referred to as a "chip"). The processing circuitry is configured to execute computer programs, which are stored onboard the processing circuitry or otherwise stored in the memory 504 (of the same or another apparatus).

The processing circuitry 502 includes a number of processors, a multi-core processor or some other type of processor, depending on the particular implementation. Further, the processing circuitry is implemented using a number of heterogeneous processor systems in which a main processor is present with one or more secondary processors on a single chip. As another illustrative example, the processing circuitry is a symmetric multi-processor system containing multiple processors of the same type. In yet another example, the processing circuitry is embodied as or otherwise include one or more ASICs, FPGAs or the like. Thus, although the processing circuitry is capable of executing a computer program to perform one or more functions, the processing circuitry of various examples is capable of performing one or more functions without the aid of a computer program. In either instance, the processing circuitry is appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory includes volatile and/or non-volatile memory, and is fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks include compact disk—read only memory (CD-ROM), compact disk—read/write (CD-R/W), DVD or the like. In various instances, the memory is referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein generally refer to a computer-readable storage medium or computer-readable transmission medium.

In addition to the memory 504, the processing circuitry 502 is also connected to one or more interfaces for displaying, transmitting and/or receiving information. The interfaces include a communications interface 508 (e.g., communications unit) and/or one or more user interfaces. The communications interface is configured to transmit and/or receive information, such as to and/or from other apparatus(es), network(s) or the like. The communications interface is configured to transmit and/or receive information by physical (wired) and/or wireless communications links. Examples of suitable communication interfaces include a network interface controller (NIC), wireless NIC (WNIC) or the like.

The user interfaces include a display 510 and/or one or more user input interfaces 512 (e.g., input/output unit). The display is configured to present or otherwise display information to a user, suitable examples of which include a liquid crystal display (LCD), light-emitting diode display (LED), plasma display panel (PDP) or the like. The user input interfaces are wired or wireless, and are configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces further include one or more interfaces for communicating with peripherals such as printers, scanners or the like.

As indicated above, program code instructions are stored in memory, and executed by processing circuitry that is thereby programmed, to implement functions of the systems, subsystems, tools and their respective elements described herein. As will be appreciated, any suitable program code instructions are loaded onto a computer or other programmable apparatus from a computer-readable storage medium to produce a particular machine, such that the particular machine becomes a means for implementing the functions specified herein. These program code instructions are also stored in a computer-readable storage medium that direct a computer, a processing circuitry or other programmable apparatus to function in a particular manner to thereby generate a particular machine or particular article of manufacture. The instructions stored in the computer-readable storage medium produce an article of manufacture, where the article of manufacture becomes a means for implementing functions described herein. The program code instructions are retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions are performed sequentially such that one instruction is retrieved, loaded and executed at a time. In some example implementations, retrieval, loading and/or execution are performed in parallel such that multiple instructions are retrieved, loaded, and/or executed together. Execution of the program code instructions produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, the apparatus 500 includes the processing circuitry 502 and the computer-readable storage medium or memory 504 coupled to the processing circuitry, where the processing circuitry is configured to execute computer-readable program code 506 stored in the memory. It will also be understood that one or more functions, and combinations of functions, are implemented by special purpose hardware-based computer systems and/or processing circuitry which perform the specified functions, or combinations of special purpose hardware and program code instructions.

Many modifications and other implementations of the inventions set forth herein will come to mind to one skilled in the art to which these disclosed implementations pertain having the benefit of the teachings presented in the foregoing descriptions and the associated drawings. Therefore, it is to be understood that implementations of the invention are not to be limited to the specific implementations disclosed and that modifications and other implementations are intended to be included within the scope of the invention. Moreover, although the foregoing descriptions and the associated drawings describe example implementations in the context of certain example combinations of elements and/or functions, it should be appreciated that different combinations of elements and/or functions are provided by alternative implementations without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. are used herein to describe various steps or calculations, these steps or calculations should not be limited by these terms. These terms are only used to distinguish one operation or calculation from another. For example, a first calculation is termed a second calculation, and, similarly, a second step is termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular implementations only and is not intended to be limiting.

That which is claimed:

1. A method of managing one or more missions of a vehicle, the method comprising:
- receiving, using a device, an instruction regarding a first task graph for a first mission of the vehicle;
- storing, using the device, the first task graph in a task storage unit;
- providing, using the device, instructions to the vehicle to execute maneuvers for traveling along a route according to a first route map in order to complete one or more tasks in the first task graph;
- executing, using the device, the one or more tasks, in the first task graph according to the first route map for the first mission;
- storing, using the device, a second task graph, for a second mission of the vehicle, in the task storage unit based on a change instruction;
- discontinuing, using the device, execution of the first task graph using the first route map; and
- executing, using the device, the second task graph, from the task storage unit according to a second route map for the second mission.

2. The method of claim 1, further comprising:
- providing instructions to the vehicle for completing selected tasks in the first task graph.

3. The method of claim 1, further comprising:
- modifying the first task graph or the second task graph.

4. The method of claim 1 wherein the first route map and the second route map are stored in a central route storage.

5. The method of claim 1, further comprising:
- resuming to execute one or more remaining tasks from the one or more tasks of the first task graph based on the vehicle completing the second mission.

6. The method of claim 1, wherein the first route map is stored in a first route storage unit and the second route map is stored in a second route storage unit that is discrete from the first route storage unit.

7. The method of claim 1, further comprising:
- querying a route service device for the instructions to execute maneuvers for traveling along the route according to the first route map.

8. A device, comprising:
- one or more memories; and
- one or more processors to:
  - receive an instruction regarding a first task graph for a first mission of a vehicle;
  - store the first task graph in a task storage unit;

provide instructions to the vehicle to execute maneuvers for traveling along a route according to a first route map in order to complete one or more tasks in the first task graph;

execute the one or more tasks in the first task graph for the first mission;

store a second task graph, for a second mission of the vehicle, in the task storage unit based on a change instruction;

discontinue to execute the first task graph; and execute the second task graph from the task storage unit for the second mission.

9. The device of claim 8, wherein the device is engaged with the vehicle.

10. The device of claim 8, wherein the first task graph is received from a ground station.

11. The device of claim 8, wherein the first route map associated with the first task graph and a second route map associated with the second task graph are stored in a central route storage.

12. The device of claim 8, wherein the vehicle is an aircraft and the first mission includes one or more of:

flying to a waypoint, loitering, take-off, or landing.

13. The device of claim 8, wherein the one or more processors are further to:

resume execution of one or more remaining tasks from the one or more tasks of the first task graph based on the vehicle completing the second mission.

14. The device of claim 8, wherein the one or more processors are further to:

modify the first task graph or the second task graph.

15. A non-transitory computer-readable medium storing a set of instructions, the set of instructions comprising:

one or more instructions that, when executed by one or more processors of a device, cause the device, which is engaged with a vehicle, to:

receive an instruction regarding a first task graph for a first mission of a vehicle;

store the first task graph in a task storage unit;

provide instructions to the vehicle to execute maneuvers for traveling along a route according to a first route map in order to complete one or more tasks in the first task graph;

execute the one or more first tasks in the first task graph using the first route map for the first mission;

store a second task graph, for a second mission of the vehicle, in the task storage unit based on a mission change request;

discontinue to execute the first task graph using the first route map; and execute the second task graph from the task storage unit using a second route map for the second mission.

16. The non-transitory computer-readable medium of claim 15, wherein the task storage unit has a first task storage unit and a second task storage unit, wherein the first task storage unit and the second task storage unit are each configured to store a single task graph.

17. The non-transitory computer-readable medium of claim 16, wherein the one or more instructions further cause the device to:

clear the first task storage unit.

18. The non-transitory computer-readable medium of claim 15, wherein the one or more instructions further cause the device to:

provide instructions to the vehicle for completing selected tasks in the first task graph.

19. The non-transitory computer-readable medium of claim 15, wherein the one or more instructions further cause the device to:

modify the first task graph or the second task graph.

20. The non-transitory computer-readable medium of claim 15, wherein the one or more instructions further cause the device to:

resume executing of one or more remaining tasks from the one or more first tasks based on the vehicle completing the second mission.

* * * * *